United States Patent [19]
Peterson

[11] Patent Number: 5,465,020
[45] Date of Patent: Nov. 7, 1995

[54] INTEGRAL SHAFT BEARING AND BOBBIN FOR ELECTRIC MOTORS

[75] Inventor: Brian Peterson, Woodbury, Conn.

[73] Assignee: Tri-Tech, Inc., Waterbury, Conn.

[21] Appl. No.: 178,907

[22] Filed: Jan. 7, 1994

[51] Int. Cl.[6] ................................................... H02K 5/16
[52] U.S. Cl. .................... 310/194; 310/43; 310/45; 310/90; 310/261
[58] Field of Search .................... 310/194, 90, 179, 310/45, 43, 261, 89; 336/185, 208

[56] References Cited

U.S. PATENT DOCUMENTS

| | | | |
|---|---|---|---|
| 3,751,671 | 8/1973 | Morley | 310/41 |
| 4,115,713 | 9/1978 | da Costa | 310/90 |
| 4,259,603 | 3/1981 | Uchiyama | 310/90 |
| 4,352,036 | 9/1982 | Kuwako | 310/90 |
| 4,358,691 | 11/1982 | Naylor | 310/12 |
| 4,737,673 | 4/1988 | Wrobel | 310/90 |
| 4,818,911 | 4/1989 | Taguchi | 310/194 |
| 5,126,605 | 6/1992 | Palermo | 310/36 |

*Primary Examiner*—R. Skudy
*Attorney, Agent, or Firm*—John H. Crozier

[57] ABSTRACT

In a preferred embodiment, in an electric motor of the type having a housing, a non-metallic bobbin upon which is wound a stator coil, a rotor having a rotor shaft fixedly attached thereto and extending therefrom, the rotor being disposed for rotation axially centrally of the bobbin, the improvement including: a bearing structure, the bearing structure being formed integrally with the non-metallic bobbin and having a central opening for the journalling therein of the rotor shaft.

6 Claims, 4 Drawing Sheets

INTEGRAL SHAFT BEARING AND BOBBIN FOR ELECTRIC MOTORS

BACKGROUND OF THE INVENTION

1. Field of the Invention

The present invention relates to electric motors generally and, more particularly, but not by way of limitation, to a novel integral shaft beating and bobbin structure for electric motors.

2. Background Art

Although electric motors have a variety of configuration, many electric motors, and, particularly, rotary stepping motors, typically include a rotating member, or rotory disposed for rotation within an annular stationary member, or stator, the stator comprising a coil of wire wound upon a bobbin. The rotor and the stator are fixed between end plates, with a rotor shaft attached to and extending from the rotor and journalled in bronze bearings pressed into the end plates.

An electric motor constructed as outlined above has a relatively high parts count and, therefore, is relatively expensive to construct. In addition, the multiplicity of parts can result in additive concentricity tolerances and, therefore, it can be difficult to achieve the required precise alignment of the upper and lower bronze bearings. Also, conventional bronze bearings tend to lose lubricity and can seize to the rotor shafts at low temperatures. As a countermeasure to the latter problem, larger tolerances are used; however, in some applications, such as when stepping motors are employed in bar code readers, the larger tolerances lead to "FIG. 8" scanning which can result in the misreading or the non-reading of bar codes.

Accordingly, it is a principal object of the present invention to provide a bearing structure for electric motors that is simple in construction.

It is a further object of the invention to provide such a bearing structure that eliminates or reduces the addition of concentricity tolerances during assembly.

It is an additional object of the invention to provide such a bearing structure that may be economically manufactured.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, in an electric motor of the type having a housing, a non-metallic bobbin upon which is wound a stator coil, a rotor having a rotor shaft fixedly attached thereto and extending therefrom, said rotor being disposed for rotation axially centrally of said bobbin, the improvement comprising: a bearing structure, said bearing structure being formed integrally with said non-metallic bobbin and having a central opening for the journalling therein of said rotor shaft.

BRIEF DESCRIPTION OF THE DRAWINGS

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
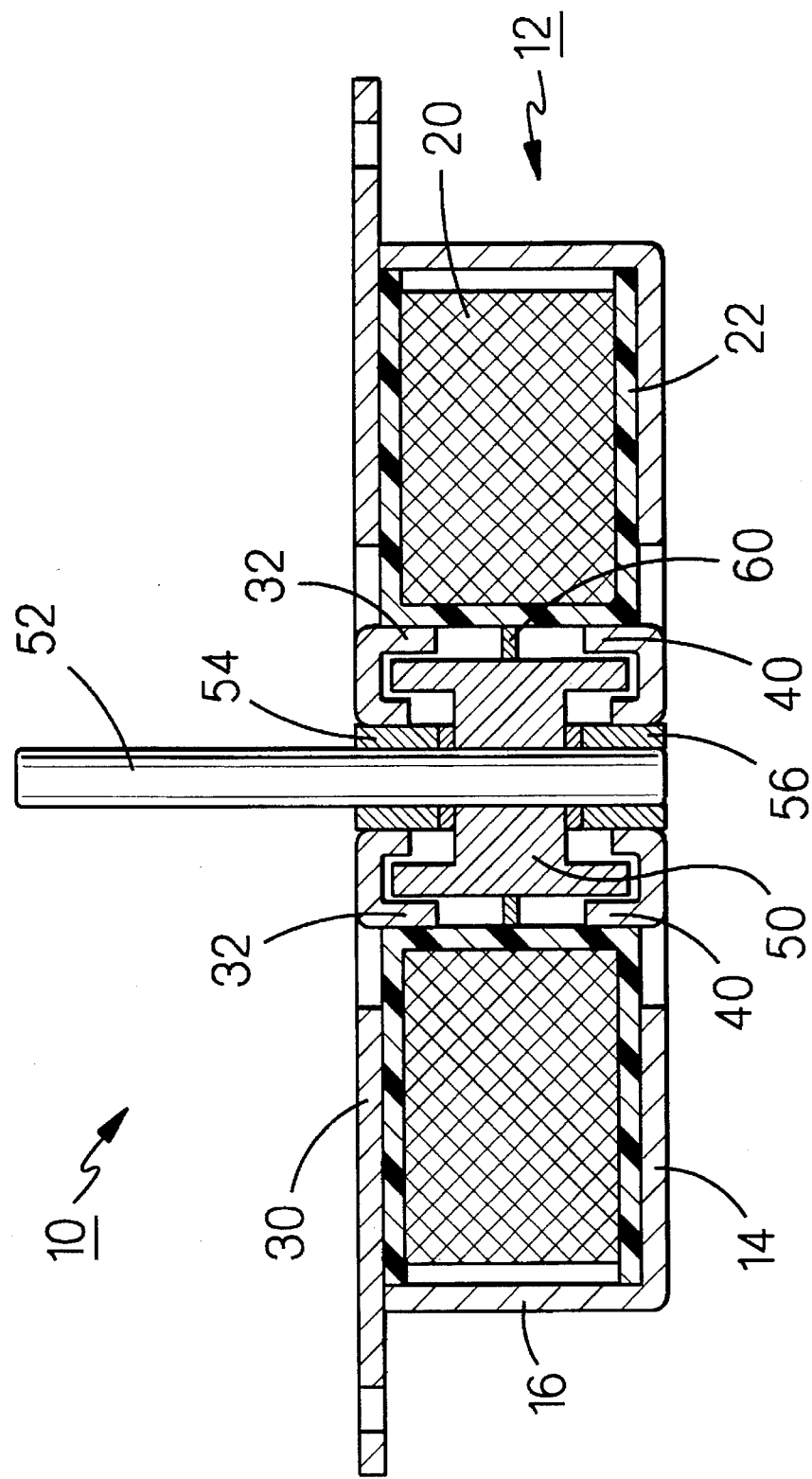
FIG. 1 is a side elevational view, partially in cross-section, of one type of conventionally constructed electric motor.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

Referring now to FIG. 1, there is illustrated a conventionally constructed electric motor, generally indicated by the reference numeral 10, the construction of which motor is described in detail in U.S. Pat. No. 5,126,605, issued Jun. 30, 1992, to Albert Palmero, assigned to the assignee of the present invention, and titled OSCILLATING STEPPER MOTOR, the disclosure of which patent is incorporated by reference hereinto.

Motor 10 includes a magnetically conductive casing, generally indicated by the reference numeral 12, which includes a base plate portion 14 and a cylindrical shell portion 16 formed integrally with the base plate portion. Disposed within casing 12 is an electrically conductive annular stator coil 20 wound upon a annular plastic bobbin 22. Wire leads (not shown) supply electrical current to stator coil 20 of motor 10.

A magnetically conductive cover plate 30 is disposed at the top of shell 16 and has a plurality of upper pole pieces, as at 32, formed by slitting the cover plate and bending the resulting tabs orthogonally downwardly to form the pole pieces which lie adjacent the inner periphery of bobbin 22. Likewise, a plurality of lower pole pieces, as at 40, are formed in base plate portion 14 by slitting the base plate portion and bending the resulting tabs orthogonally upwardly to form the pole pieces which lie adjacent the inner periphery of bobbin 22.

A generally cylindrical, axially magnetized rotor magnet 50 is disposed axially centrally of bobbin 22 and extends generally between base plate portion 14 and cover plate 30 along the thickness of stator coil 20. A rotor shaft 52 is fixedly attached to rotor magnet 50 and is journalled for rotation in upper and lower bronze bearings 54 and 56, respectively, the bearings being pressed into openings defined in cover plate 30 and lower base member 14, respectively. In some conventional designs, only one of bronze bearings 54 and 56 is provided. An axially magnetized, annular, biasing magnet 60 is fixedly attached to the inner periphery of bobbin 20 at approximately the axial midpoint of rotor magnet 50.

Reference should be made to the above-referenced patent for a description of the operation, and further construction details, of motor 10. However, it will be understood from an inspection of FIG. 1 and reference to the foregoing remarks with respect to disadvantages of some conventionally constructed electric motors, that precise alignment of bearings 54 and 56 is critical and that the provision of separate bearing structures adds to parts count and cost. Additive concentricity tolerances between various elements of motor 10 may be additive, resulting in poor coaxial alignment of rotor magnet 50 and bobbin 20 which impairs motor performance.

Figure 2:
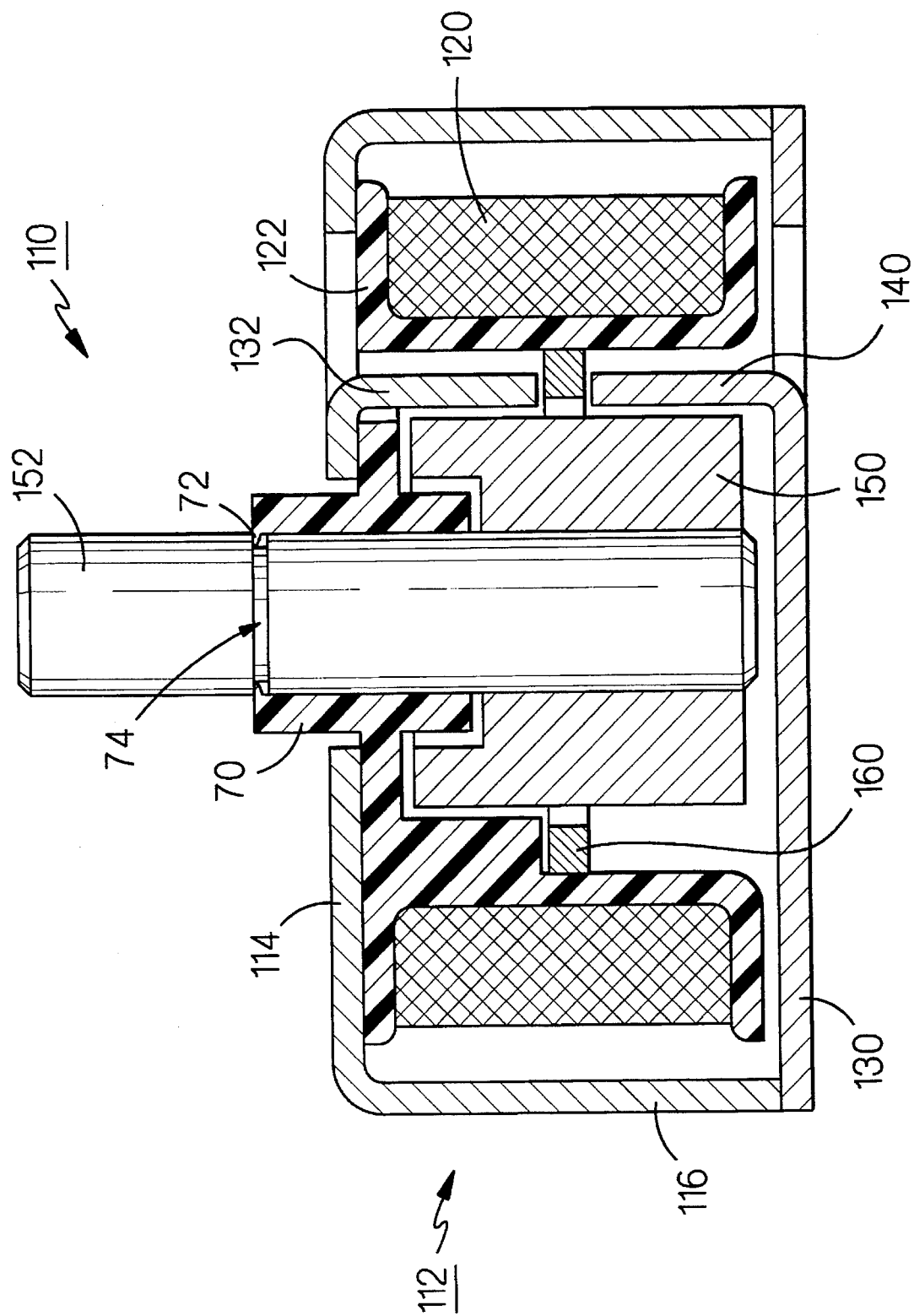
FIG. 2 is a side elevational view, partially in cross-section, of a motor constructed according to one embodiment of the present invention.

Referring now to FIG. 2, there is illustrated an electric motor, constructed according to one aspect of the present invention, and generally indicated by the reference numeral 110. Since the elements of motor 110 are somewhat similar to the elements of motor 10 (FIG. 1), although, in some cases, somewhat rearranged, elements of motor 110 common to elements of motor 10 are given the same reference numerals as the elements of motor 10, except with the addition of the prefix "1" thereto for motor 110. Accordingly, motor 110 includes a magnetically conductive casing, generally indicated by the reference numeral 112, a base plate portion 114, a cylindrical shell portion 116, an annular stator coil 120 wound upon an annular plastic bobbin 122, a cover plate 130, upper pole pieces, as at 132, lower pole pieces, as at 140, a rotor magnet 150, a rotor shaft 152, and a biasing magnet 160.

Biasing magnets 60 (FIG. 1) and 160 (FIG. 2) assist in providing oscillatory stepping motion, as described in the above-referenced patent, but are of no importance in practicing the present invention.

It will be seen that motor 110 (FIG. 2) includes no pressed bearings, but, instead, rotor shaft 152 is journalled in a single, cylindrical bearing structure 70 formed monolithically with bobbin 122. Bearing structure 70 and rotor shaft 152 are secured against relative axial movement by means of an annular, inwardly extending lip 72 formed around the inner periphery of the upper edge of the bearing structure and engaging a complementarily dimensioned channel 74 defined in the outer periphery of the rotor shaft. With a relatively long bearing structure 70, the bearing structure and rotor shaft 152 are virtually self-aligning.

The material of bobbin 122 and bearing structure 70 should be a material having structural rigidity, but somewhat resilient to permit the insertion of rotor shaft 152 in bearing structure 70, and should possess good surface lubricity. Such a material is DALRIN an acetyl resin material, furnished by DuPont Inc. With the use of such a non-metallic material, cold temperature performance is greatly improved and, consequently, closer tolerances may be employed, thus eliminating or greatly reducing "FIG. 8" motion in critical applications such as bar code reading.

Figure 3:
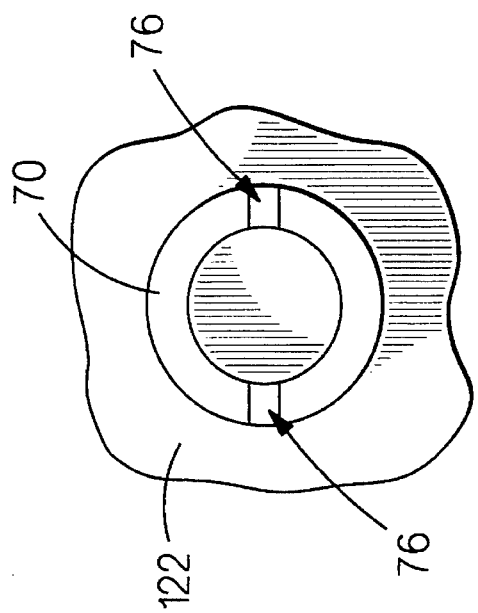
FIG. 3 is a fragmentary top plan view of the bearing structure and bobbin of the motor of FIG. 2.

Rotor shaft 152 is inserted in bearing structure 70 by the temporary elastic deformation of the distal end of the bearing structure in which is formed lip 72. This elastic deformation is facilitated by the provision of vertical slots 76 defined in the distal end of bearing structure 70, as is shown on FIG. 3.

It will be seen that the bearing surface for shaft 152 is an integral part of bobbin 122 and, thus, rotor magnet 150 will be held in more precise coaxial alignment with the bobbin.

Figure 4:
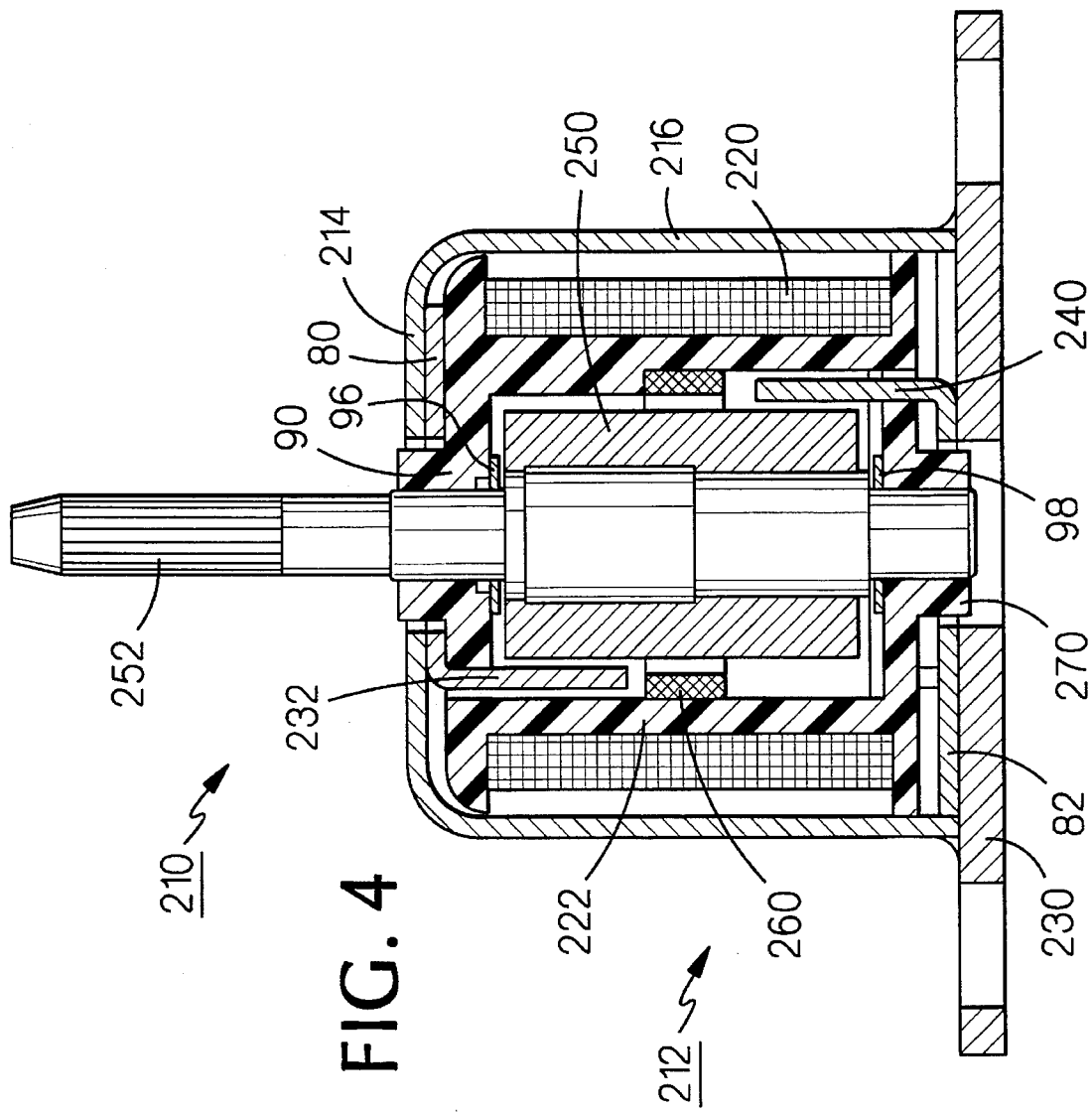
FIG. 4 is a side elevational view, partially in cross-section, of a motor constructed according to another embodiment of the present invention.

FIG. 4 illustrates an electric motor, constructed according to another aspect of the present invention, and generally indicated by the reference numeral 210. Since the elements of motor 210 are somewhat similar to the elements of motor 10 (FIG. 1), although, in some cases, somewhat rearranged, elements of motor 210 common to elements of motor 10 are given the same reference numerals as the elements of motor 10, except with the addition of the prefix "2" thereto for motor 210. Accordingly, motor 210 includes a magnetically conductive casing, generally indicated by the reference numeral 212; a base plate portion 214; a cylindrical shell portion 216; an annular stator coil 220 wound on an annular plastic bobbin 222; a cover plate 230; upper pole pieces, as at 232, formed in a pole plate 80 attached to base plate portion 214; lower pole pieces, as at 240, formed in a pole plate 82 attached to cover 230; a rotor magnet 250; a rotor shaft 252; and a biasing magnet 260. Again, biasing magnet 260 forms no part of the present invention. Thrust washers 96 and 98 prevent the axial movement of rotor shaft 252 relative to bobbin 222.

Motor 210 is of the type requiring, or the application in which it is used requires, bearings at either end of rotor magnet 250. Thus, a bearing structure 270 formed monolithically with bobbin 220 is provided for the journalling therein of rotor shaft 152 at the lower end of rotor magnet 150 and a second bearing structure 90 is provided for the journalling therein of the rotor shaft at the upper end of the rotor magnet. Bearing structure 90 is pressed or snapped into the opening defined by the upper end of bobbin 220 after assembly of the other elements of motor 210. Since a degree of resilience is not required for the non-metallic elements of motor 210, bobbin 222 and bearing structures 70 and 90 are preferably formed from a material such as RYNITE a polyester resin, furnished by DuPont, Inc. Having both bearing structures 70 and 90 formed from Rynite eliminates or reduces seizing, as is noted above. Bearing structure 90 may also be bronze or other suitable material, if desired, and may be pressed into base plate portion 214, similar to lower bearing 56 on FIG. 1.

Figure 5:
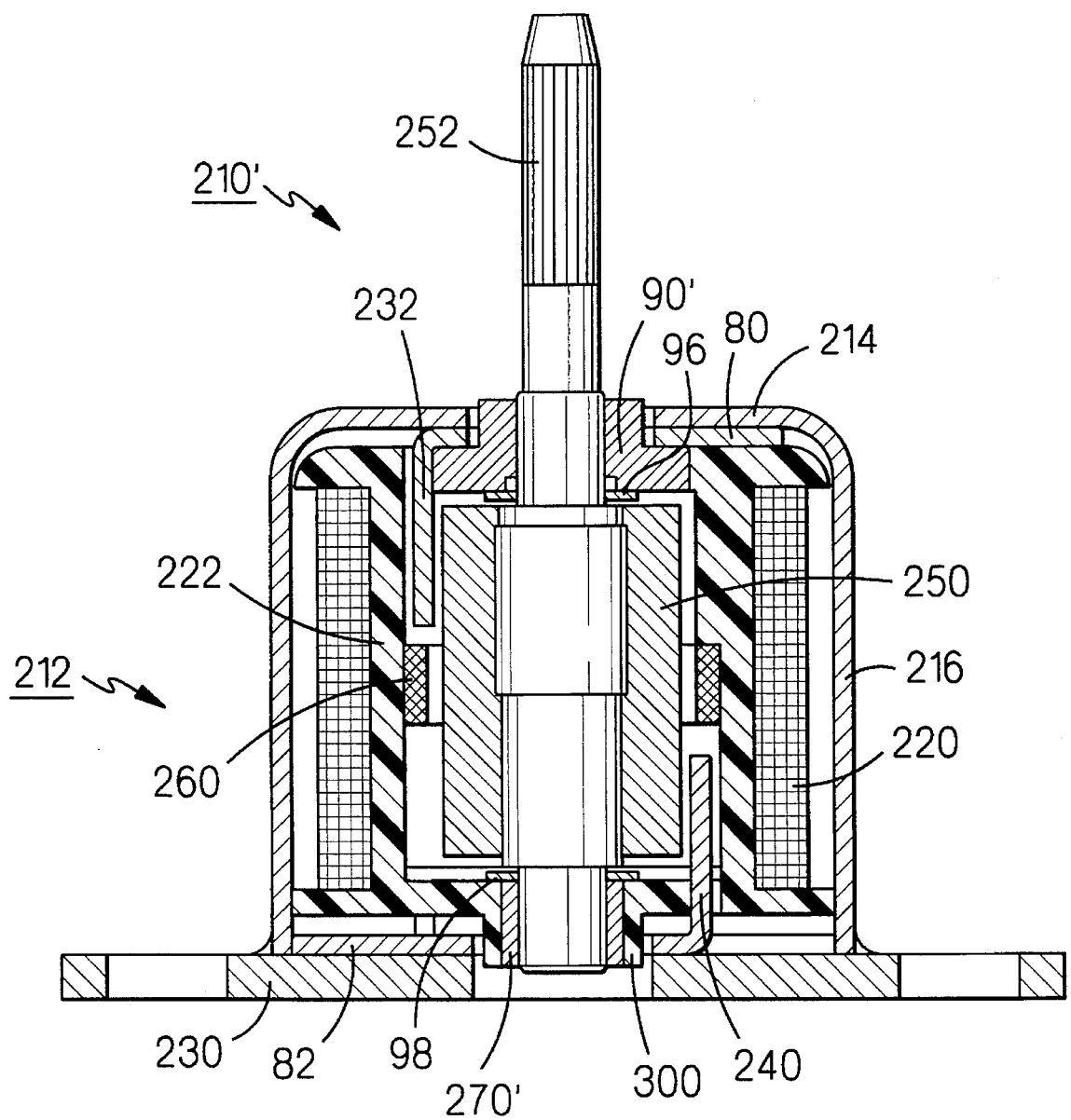
FIG. 5 is a side elevational view, partially in cross-section, of a motor constructed according to yet another embodiment of the present invention.

FIG. 5 illustrates a motor, generally indicated by the reference numeral 210' for use in applications in which metallic bearing surfaces are desired. Motor 210' is nearly identical to motor 210 on FIG. 4, except that bearing structure 90 (FIG. 4) has been replaced with a bronze bearing structure 90' and bearing structure 270 (FIG. 4) has been replaced with a bronze bearing 270' pressed or molded into a boss 300 formed as an extension of the lower portion of bobbin 222. Bronze bearings 90' and 270' are integral with bobbin 222, thus also minimizing or reducing concentricity problems in the manufacture of motor 210'.

Although not quite as simply constructed as motor 110 (FIG. 2) in terms of parts count, motor 210 (FIG. 4) is more simply constructed than motor 10 (FIG. 1), in that monolithic bearing structure 70 is provided, thus simplifying alignment and reducing concentricity problems.

Elements of motors 110 (FIG. 2) and 210 (FIG. 4), other than bearing structures 70 and 90, may be constructed of any suitable materials known in the art.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. In an electric motor of the type having a housing, a non-metallic bobbin upon which is wound a stator coil, a rotor having a rotor shaft fixedly attached thereto and extending therefrom, said rotor being disposed for rotation axially centrally of said bobbin, the improvement comprising: providing a bearing structure, said bearing structure being monolithic with said bobbin and having a central opening for journaling therein of said rotor shaft, and said bearing structure and said rotor shaft being secured against relative axial movement by means of an annular, inwardly extending lip formed around an inner periphery of said bearing structure and engaging a complementarily dimensioned channel defined in an outer periphery of said rotor shaft.

2. An improved electric motor, as defined in claim 1, wherein said first bearing structure is formed monolithically with said bobbin.

3. An improved electric motor, as defined in claim 1, wherein said bobbin and said bearing structure are formed from DELRIN.

4. An improved electric motor, as defined in claim 1, wherein: said rotor shaft is inserted in said bearing structure by temporary elastic deformation of a portion of said bearing structure of which said lip is a part.

5. An improved electric motor, as defined in claim 4, wherein: said temporary elastic deformation is facilitated by slots defined in said portion of said bearing structure.

6. An improved electric motor, as defined in claim 1, wherein said bobbin and said bearing structure are formed from RYNITE.

\* \* \* \* \*